United States Patent [19]
Bertiger et al.

[11] Patent Number: 5,812,086
[45] Date of Patent: Sep. 22, 1998

[54] METHOD AND APPARATUS FOR PROVIDING DUPLEX COMMUNICATION SERVICE IN GEOGRAPHICAL AREAS WHERE CONVENTIONAL SERVICES ARE OBSTRUCTED

[75] Inventors: Bary Robert Bertiger, Scottsdale; David Warren Corman, Gilbert; Dean Lawrence Cook, Mesa; Kristine Patricia Maine, Phoenix; Keith Vaclav Warble, Chandler, all of Ariz.

[73] Assignee: Motorola, Inc., Schaumburg, Ill.

[21] Appl. No.: 672,171

[22] Filed: Jun. 27, 1996

[51] Int. Cl.⁶ .................................................. H04M 11/00
[52] U.S. Cl. ......................... 342/357; 342/353; 701/207; 455/456
[58] Field of Search ..................... 342/357, 353; 364/449.7; 455/560, 561, 562, 66, 456, 427

[56] References Cited

U.S. PATENT DOCUMENTS

| | | | |
|---|---|---|---|
| 5,117,490 | 5/1992 | Duxbury et al. | 395/375 |
| 5,235,633 | 8/1993 | Dennison et al. | 379/60 |
| 5,282,239 | 1/1994 | Yokoi et al. | 455/456 X |
| 5,363,425 | 11/1994 | Mufti et al. | 379/38 |
| 5,382,958 | 1/1995 | FitzGerald | 342/386 |
| 5,418,537 | 5/1995 | Bird | 342/357 |
| 5,438,337 | 8/1995 | Aguado | 342/357 |

FOREIGN PATENT DOCUMENTS

3-291582 12/1991 Japan .................................. 342/352

*Primary Examiner*—Joseph L. Felber
*Attorney, Agent, or Firm*—Sherry J. Whitney; Jennifer B. Wuamett

[57] ABSTRACT

A system (10) and method delivers geolocation or other signals (26, 28) to a communication unit (24) located within an area (20) (e.g., a building) where an obstruction exists between the signal transmitter (12, 18) and the communication unit (24). The system (10) uses an infrastructure transceiver apparatus (14, 16, 22) to receive (204, 304, 604) the signals (26, 28) and retransmit (208, 310, 610) them within the area (20). A communication unit (24) calculates responsive data, such as its approximate position, from the retransmitted signals and reports (406, 704) the responsive data to a host system via the infrastructure transceiver apparatus (14, 16, 22).

21 Claims, 5 Drawing Sheets

METHOD AND APPARATUS FOR PROVIDING DUPLEX COMMUNICATION SERVICE IN GEOGRAPHICAL AREAS WHERE CONVENTIONAL SERVICES ARE OBSTRUCTED

CROSS-REFERENCE TO RELATED APPLICATION

This application is related to co-pending U.S. patent application Ser. No. 08/670,304, entitled "Method and Apparatus for Simplex Delivery of Signals to Obstructed Geographical Areas", filed concurrently herewith and assigned to the same assignee as the present invention.

FIELD OF THE INVENTION

The present invention relates generally to position determination of remote communication units and, more particularly, to position determination using satellites of a geolocation system.

BACKGROUND OF THE INVENTION

The quality of a radio frequency (RF) signal can be severely degraded when obstacles exist between the signal transmitter (e.g., a cellular base station or a satellite) and a receiver (e.g., a pager or cellular telephone). Where an obstacle is substantial enough, a signal can be completely blocks Significant signal degradation occurs within obstructed areas such as, for example, dense urban areas, tunnels, and in heavily forested or mountainous regions.

Often times, a user of a cellular telephone or pager must change his or her position in order to obtain acceptable communication quality. Users located within buildings, for example, might need to move outside the building in order to receive signals from a particular communication system.

The necessity to reorient oneself depends on the ability of a communication system signal to penetrate the obstacles which exist between a system transmitter and a receiver. This ability depends, in part, on the transmission strength of the signal and the distance between the system transmitter and the receiver.

Signals from navigation satellites suffer substantially from obstacles along the transmission path because such satellites are located at great distances (i.e., approximately 11,000 miles) from the surface of the earth. Receivers which are located within buildings or other obstructed areas are often incapable of receiving navigation satellite signals. This precludes the users of such receivers from receiving services, such as geolocation services, provided by those satellites.

Similar communication limitations can exist for services provided from either Low Earth Orbiting (LEO) satellites or Medium Earth Orbiting (MEO) satellites in that they are also located at large distances from the surface of the earth and can suffer from unfavorable angles of signal arrival. Receivers located within obstructed areas could also be precluded from receiving service provided by the LEO or MEO satellites.

Geolocation services are particularly important for cellular telephone and pager use. A worldwide communication system (e.g., a worldwide satellite communication system), for example, must have knowledge of the location of a mobile telephone or pager in order to contact the device. In addition, a device's location is often used for billing purposes. Prior art systems use an identification number of a cell within which the device is communicating to make a rough approximation of the device's location. However, the granularity of the approximation is governed by the size of the cell which can be as large as 500 kilometers in diameter. A more accurate determination of location is often necessary, especially near international borders where billing differences are important. This makes the ability of the device to use geolocation desirable.

Prior art solutions to the blocked signal problem involve positioning an antenna in a location (e.g., on a rooftop) where the antenna is capable of receiving the otherwise degraded signals. The antenna is then hardwired to the receiver. Although this approach works well for stationary equipment such as a stationary television, for example, a hardwired connection is impractical between a stationary antenna and a portable communication device such as a pager, mobile telephone, portable facsimile, data, or television equipment.

As stated earlier, a communication system needs communication unit position information for accurate billing, paging, and ring alert (i.e., "ringing" a communication unit when there is an incoming call). When a communication unit is capable of calculating its position (e.g., using navigation satellites), the communication unit can send the position inform to the host system However, the same obstructions which make communication unit reception of geolocation (or other) signals difficult can also make transmission of position information to a host system difficult.

What is needed is a method and apparatus which enables portable communication devices to receive geolocation signals so that accurate position determination can be achieved, and also to report the accurate position information to the communication device's host system. What is further needed is a method and apparatus which allows full duplex voice, data, facsimile, and other communication services to be provided in obstructed areas.

DETAILED DESCRIPTION OF THE DRAWINGS

The method and apparatus of the present invention enables portable communication devices to receive geolocation signals so that accurate position determination can be achieved, and also to report the accurate position information to the communication device's host systems The method and apparatus of the present invention also allows full duplex voice, data, facsimile, and other communication services to be provided in obstructed areas.

The method and apparatus of the present invention achieves these advantages, and more, by providing a signal transceiver means which captures signals and retransmits them within an obstructed area to portable communication devices within that area. A communication device can then generate responsive data from the information and report the reponsive data to a host system using the signal transceiver means. For example, a captured signal can be a geolocation signal and the responsive data can be a position of the communication device which is generated from a retransmitted geolocation signal. As another example, the captured signal can contain voice data from a remote device and the responsive data can be voice data from the communication device.

The method and apparatus of the present invention can be used in any area within which signals are obstructed. Portions of the description describe the apparatus of the present invention being deployed within a building, but this is for exemplary purposes only. The apparatus and method of the present invention are equally applicable to other obstructed areas (e.g., tunnels, mines, ships, urban canyons). In addition, the description describes reporting of position in particular. This also is for exemplary purposes only, and the method and apparatus of the present invention can be used to report or communicate other types of duplex information (e.g., health, telemetry, voice, facsimile, and other information).

Figure 1:
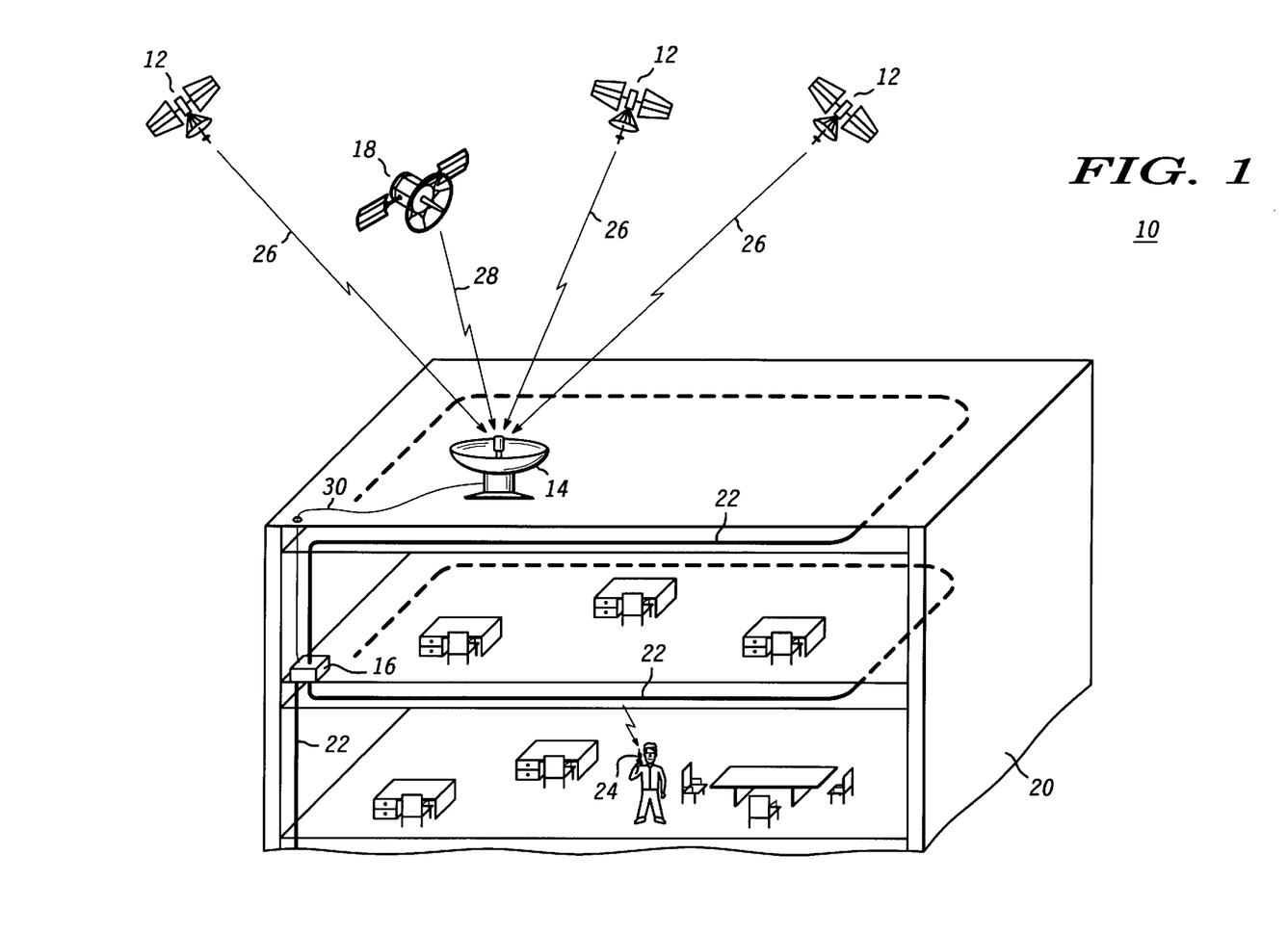
FIG. 1 illustrates a communication system in accordance with a preferred embodiment of the present invention.

FIG. 1 illustrates communication system 10 in accordance with a preferred embodiment of the present invention. Communication system 10 comprises multiple navigation satellites 12, antenna 14, at least one repeater base station 16, and at least one communication unit 24. Communication unit 24 could be, for example, a portable or stationary telephone, radio, pager, facsimile, data device, television, or other communication device. In a preferred embodiment, communication system 10 also comprises at least one communication satellite 18, although, in alternate embodiments, communication satellite 18 can be omitted.

Antenna 14 and repeater base station 16 are deployed in proximity to an area in which geolocation signals from navigation satellites 12 are attenuated due to obstructions. As shown in FIG. 1 for exemplary purposes, antenna 14 is located outside of and repeater base station 16 is located within building 20. Antenna 14 and repeater base station 16 could also be used to provide improved signal quality within any other man-made or natural obstructed area.

Navigation satellites 12 could be, for example, satellites used for geolocation such as Global Positioning System (GPS) satellites. Navigation satellites 12 communicate with antenna 14 over links 26 which can be, for example, radio frequency (RF) or laser links. In a preferred embodiment, links 26 carry almanac data (i.e., data which describes a position of the satellite) from navigation satellites 12 which can be used to calculate a position of antenna 14.

Communication satellite 18 could be, for example, a LEO, MEO, or geosynchronous satellite which can link with other nodes of a communication system in order to provide voice, data messages, and/or direct broadcast television to communication units 24 and also to receive and route, if necessary, data from communication units 24. Communication satellite 18 communicates with antenna 14 over link 28 which can be, for example, a radio frequency (RF), or laser link. Link 28 desirably carries data signals such as, for example, voice, pager, facsimile, and/or direct broadcast television data. In an alternate embodiment, earth-based transmission devices, such as a cellular base station or radio, could be used to provide voice and data messages rather than communication satellite 18.

Repeater base station 16 is coupled to antenna 14 via link 30 which can be, for example, a cable or an RF, fiber optic, or laser link. Repeater base station 16 can be co-located with or remote from antenna 14. Repeater base station is also coupled to signal distribution means 22. Signal distribution means 22 can be, for example, a leaky coaxial cable, conventional coaxial cable, fiber-optic cable, or broadcast antenna. Signal distribution means 22 is desirably positioned so that signal distribution means 22 can retransmit signals within obstructed areas (e.g., buildings, tunnels, urban canyons) in which navigation satellite signals and/or communication satellite signals cannot adequately penetrate. For example, signal distribution means 22 could be located within a dropped ceiling or raised floor on each floor of building 20.

As will be described in detail in conjunction with FIGS. 2–13, when signals are received by antenna 14 from either or both navigation satellites 12 and communication satellite 18, these signals, in their original or a modified form, are sent through repeater base station 16 to signal distribution means 22. Signal distribution means 22 enables one or more communication units 24 to receive the signals which would, otherwise, have been partially or completely blocked. Signal distribution means 22 also receives signals from one or more communication units 24 so that those signals can be sent, via an antenna (e.g., antenna 14) to a satellite (e.g., communication satellite 18). A combination of antenna 14, repeater base station 16, and signal distribution means 22 is referred to herein as an "infrastructure transceiver".

After communication unit 24 receives the signals, communication unit 24 can generate responsive data in response to the signal and report the responsive data, via signal distribution means 22, to a "host system" with which communication unit 24 is registered. For example, where received signals contain geolocation information, communication unit 24 can generate reponsive data comprising an approximated location of communication unit 24. Communication unit 24 can then report the approximated location to its host system via signal distribution means 22.

Figure 2:
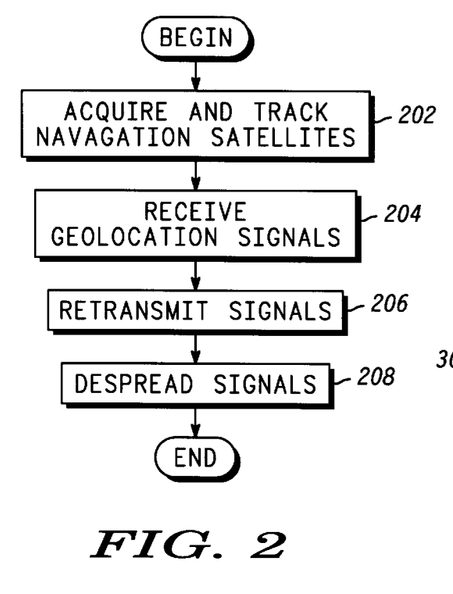
FIG. 2 illustrates a method for an infrastructure transceiver to retransmit geolocation signals within an obstructed area in accordance with a preferred embodiment of the present invention.

FIG. 2 illustrates a method for an infrastructure transceiver to retransmit geolocation signals within an obstructed area (e.g., building 20, FIG. 1) in accordance with a preferred embodiment of the present invention. In this embodiment, geolocation signals are directly retransmitted without modification. Therefore, the method of this embodiment could be considered a "bent-pipe" system.

The method begins by an antenna (e.g., antenna 14, FIG. 1) acquiring and tracking navigation satellites (e.g., navigation satellites 12, FIG. 1) in step 202. In a preferred embodiment, at least four navigation satellites are acquired and tracked in order to provide adequate data for position determination in three dimensions. In alternate embodiments, more or fewer navigation satellites can be acquired and tracked.

In step 204, the antenna receiver receives geolocation signals from multiple navigation satellites, typically in the form of spread-spectrum data.

In step 206, the spread spectrum geolocation signals are retransmitted within the obstructed area via a repeater base station (e.g., repeater base station 16, FIG. 1) and a signal distribution means (e.g., signal distribution means 22, FIG. 1). Although the term "retransmission" is used herein, it is intended to encompass signal regeneration and repeating also. Retransmission of the signals is described in more detail in conjunction with FIGS. 9–13.

The communication device (e.g., communication unit 24, FIG. 1) then despreads the signals in step 208. The despread signals enable a distance to each respective satellite to be calculated by the receiver or another device. Knowing the distance to each satellite as well as the distances between the satellites allows the receiver's unique position in space to be calculated. This function is typically performed by a geolocation (e.g., GPS) receiver. The procedure then ends.

In alternate embodiments, messages other than geolocation signals could be retransmitted using the method described in conjunction with FIG. 2. For example, the method could be used to retransmit paging or ring alerts destined for a particular communication unit. The other types of signals could originate from devices other than navigation satellites. For example, the signals could originate from IEO, MEO, or other geosynchronous satellites, or from ground based equipment. Acquisition and tracking of the other devices would be performed in accordance with the device type. In addition, the processing performed on the signal prior to retransmission would depend on the type of signal.

Figure 3:
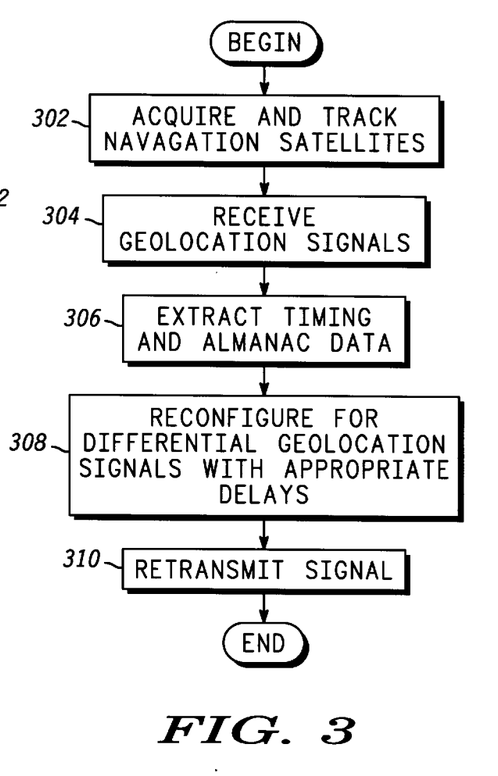
FIG. 3 illustrates a method for an infrastructure transceiver to retransmit differential geolocation signals within an obstructed area in accordance with a preferred embodiment of the present invention.

FIG. 3 illustrates a method for an infrastructure transceiver to retransmit differential geolocation signals within an obstructed area in accordance with a preferred embodiment of the present invention. In this embodiment, geolocation signals are modified prior to retransmission. The method shown in FIG. 3 is particularly useful for position determination by communication units located within large obstructed areas (e.g., tunnels or urban canyons) rather than smaller areas (e.g., buildings).

The method begins, in step 302, by an antenna (e.g., antenna 14, FIG. 1) acquiring and tracking navigation satellites (e.g., navigation satellites 12 FIG. 1). Optimally, a geolocation receiver (e.g., a GPS receiver) associated with the antenna tracks at least four navigation satellite signals. In step 304, the antenna receives geolocation signals from the navigation satellites. These signals typically are in the form of sad-spectrum data.

Timing and satellite almanac data are calculated from the geolocation signals in step 306. From the signals, the receiver calculates a range to each navigation satellite and solves for position and timing.

The geolocation signals are reconfigured, in step 308, for differential geolocation signals with appropriate delays using the extracted timing and almanac data. Differential geolocation processing requires spatially separated antenna units, dispersed at different locations around the obstructed area. These separated units are calibrated and placed in order to simulate the original navigation signal, thus allowing the receiver to calculate its position. The receiver calculates its position based on the distances between the dispersed antenna units which directly received the navigation satellite signal, or a rebroadcast of the original navigation satellite signal.

The calibrated antenna units are placed so that a more precise location can be calculated by the receiver. Similar methods have been used for aircraft instrument approaches using GPS navigation and precise geodetic measurements. However, the method of the present invention enables a much larger obstructed area to be covered than is possible with prior art methods.

In step 310, the differential geolocation signals are retransmitted, with the appropriate delays, within the obstructed area via a repeater base station (e.g., repeater base station 16, FIG. 1) and a signal distribution means (e.g., signal distribution means 22, FIG. 1). Retransmission of the signals is described in more detail in conjunction with FIGS. 9–13. The procedure then ends.

Figure 4:
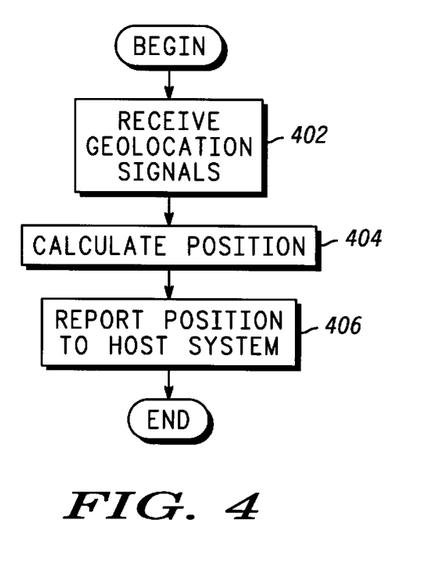
FIG. 4 illustrates a method for a communication unit having a geolocation receiver to calculate and report its position to a host system via an infrastructure transceiver in accordance with a preferred embodiment of the present invention.

FIG. 4 illustrates a method for a communication unit having a geolocation receiver to calculate and report its position to a host system via an infrastructure transceiver in accordance with a preferred embodiment of the present invention. The method begins, in step 402, when the communication unit receives geolocation signals from a signal distribution means dispersed throughout an obstructed area within which the communication unit is located. As described previously, the geolocation signals can be unmodified from the signals originally received by the infrastructure transceiver, or the signals can be modified (e.g., differential geolocation signals).

In step 404, the communication unit calculates its approximate position using the geolocation signals. Typically, position determination is performed by a geolocation processor (e.g., a GPS receiver) co-located with the communication unit. Position determination can use, for example, trangularization techniques well known to those of skill in the art.

In step 406, the communication unit reports its approximate position to a host system with which the communication unit is registered. As described previously, position reporting is desirable so that the host system will have accurate information on which to base its billing, paging, and ring alert decisions, for example. In a preferred embodiment, the communication unit reports its position by transmitting a message which includes the approximate position. The infrastructure transceiver, via signal distribution means, receives the message and, using processes which are inverse to those which will be described in conjunction with FIGS. 9–13, prepares the message to be transmitted, via an antenna located proximate to the obstructed area, to the host system. After the communication unit and infrastructure transceiver report the position, the procedure ends.

The method described in conjunction with FIG. 4 uses geolocation signal processing for exemplary purposes only. The method could be easily modified to accommodate duplex communications for other types of data such as voice, data, facsimile, for example.

Figure 5:
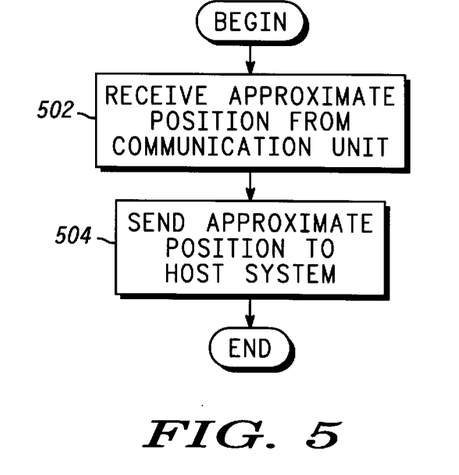
FIG. 5 illustrates a method for an infrastructure transceiver to report a communication unit's position to a host system in accordance with a preferred embodiment of the present invention.

FIG. 5 illustrates a method for an infrastructure transceiver to report a communication unit's position to a host system in accordance with a preferred embodiment of the present invention. The method begins, in step 502, when the infrastructure transceiver receives an approximated position from a communication unit over a signal distribution means. The approximated position can be received as part of a message or separately.

In step 504, the infrastructure transceiver reports the approximated position to the host system via an antenna (e.g., antenna 14, FIG. 1). In alternate embodiments, the approximated position could be reported to the host system using different equipment such as, for example, land-line equipment which can route information to the host system. After sending the approximated position to the host system, the procedure ends.

The method described in conjunction with FIG. 5 uses position reporting for exemplary purposes only. The method could be easily modified to accommodate duplex communications for other types of data such as voice, data, facsimile, for example.

Figure 6:
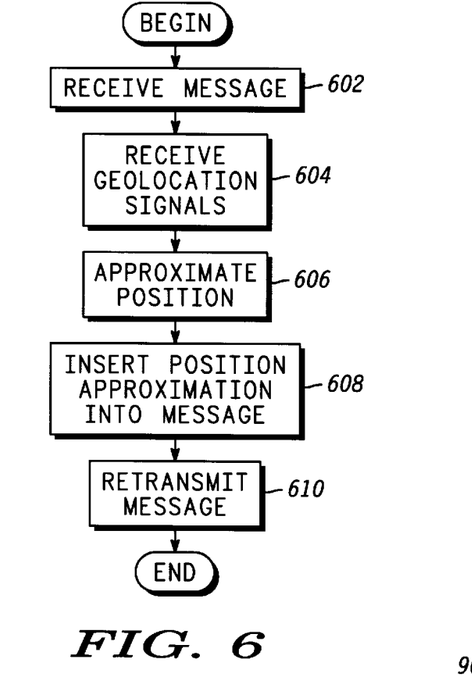
FIG. 6 illustrates a method for an infrastructure transceiver to combine and retransmit messages with geolocation signals in accordance with a preferred embodiment of the present invention.
Figure 7:
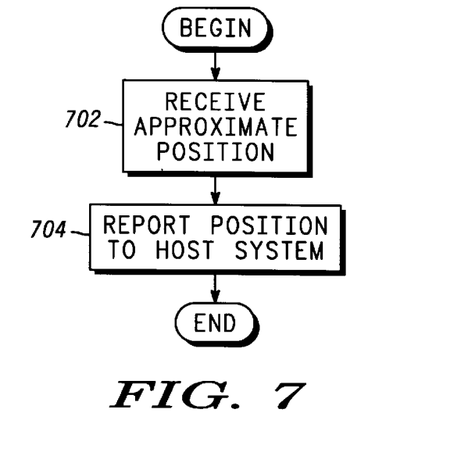
FIG. 7 illustrates a method for a communication on unit to report its position to a host system via an infrastructure transceiver without calculating the position in accordance with a preferred embodiment of the present invention.
Figure 8:
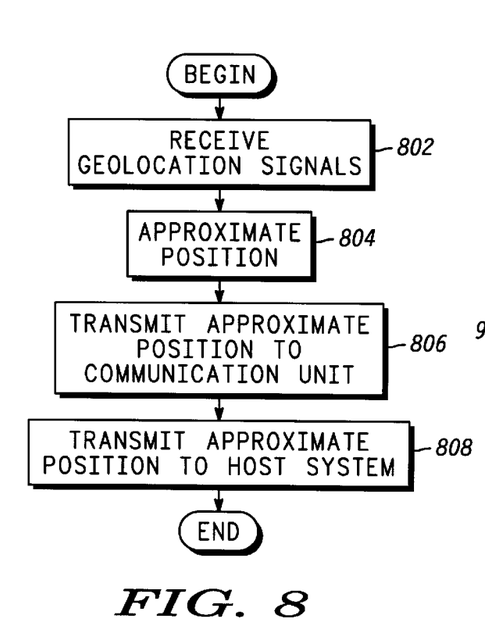
FIG. 8 illustrates a method for an infrastructure transceiver to approximate and report a communication unit's position to a host system in accordance with an alternate embodiment of the present invention.

FIGS. 2–5 illustrated embodiments where a communication unit receives unmodified or modified geolocation signals from which the communication unit can calculate its approximate position. These embodiments assume that the communication unit is capable of position calculations (i.e., that the communication unit includes a geolocation receiver). The method and apparatus of the present invention can also be used in systems where a communication unit is not capable of calculating its position. In addition, the method and apparatus of the present invention can be used for other types of communication signals. FIGS. 6–8 illustrate embodiments where a communication unit can receive a duplex geolocation service without position calculation capabilities.

FIG. 6 illustrates a method for an infrastructure transceiver to combine and retransmit messages with geolocation signals in accordance with a preferred embodiment of the present invention. Although FIG. 6 illustrates that a message is combined with the geolocation signals, the message could be retransmitted without the geolocation signals in an alternate embodiment. Such an alternate embodiment is described in conjunction with FIG. 8.

The method begins, in step 602, when an antenna (e.g., antenna 14, FIG. 1) receives a message from communication satellite (e.g., communication satellite 18, FIG. 1) or some other message source (e.g., a ground-based cellular base station). In step 604, the antenna can also receive geolocation signals such as those which have been described previously or can be programmed with its known, fixed x, y, z location in space.

From the geolocation signals, the infrastructure transceiver approximates a position of the antenna in step 606. Position estimation can be performed, for example, using triangularization or any other postion-estimation technique. For the case of a fixed location infrastructure, the programmed x, y, z location in space could be used.

In step 608, the approximated position is inserted into the received message. The message is then retransmitted, in step 610, to communication units within the obstructed area via a repeater base station (e.g., repeater base station 16, FIG. 1) and a signal distribution means (e.g., signal distribution means 22, FIG. 1). Retransmission of the signals is described in more detail in conjunction with FIGS. 9–13. The procedure then ends.

In an alternate embodiment, retransmitting an approximated position can occur without combining the approximated position with another message. In such an alternate embodiment, steps 602 and 608 would be unnecessary and step 610 would transmit the approximated position only.

The method of retransmission depends on the type of signal distribution means deployed within the obstructed area For example, the signal distribution means can be fiber-optic cable, leaky or conventional coaxial cable, or one or more broadcast antennas. FIGS. 9–13 describe methods for retransmission using various types of signal distribution means. Each of the methods of FIGS. 9–13 could be used, for example, in retransmit steps 208 (FIG. 2), 310 (FIG. 3), and 610 (FIG. 6).

After a communication unit receives a position approximation as transmitted in step 610 (FIG. 6), the communication unit can then initiate the process of reporting the position to a host system. FIG. 7 illustrates a method for a communication unit to report its position to a host system without calculating the position in accordance with a preferred embodiment of the present invention.

The method begins, in step 702, when the communication unit receives an approximation of its position via the signal distribution means (e.g., signal distribution means 22, FIG. 1). The position approximation can be received separately or in combination with another message. In a preferred embodiment, the communication unit then reports the position to the host system in step 704. Position reporting is described in detail in step 406 (FIG. 4). After reporting the communication unit position, the procedure ends.

FIG. 8 illustrates a method for an infrastructure transceiver to approximate and report a communication unit's position to a host system in accordance with an alternate embodiment of the present invention. The method described in FIG. 8 can replace the methods described in conjunction with FIGS. 5 and 6.

The method begins, in step 802, when an antenna (e.g., antenna 14, FIG. 1) receives geolocation signals from navigation satellites (e.g., navigation satellites 12, FIG. 1). From the geolocation signals, a position of the antenna is approximated in step 804. Position estimation can be performed, for example, using triangularization or any other position-estimation technique.

The approximated position is then transmitted, in step 806, to communication units located within the abstructed area via a repeater base station (e.g., repeater base station 16, FIG. 1) and a signal distribution means (e.g., signal distribution means 22, FIG. 1). Transmission of the signals is described in more detail in conjunction with FIGS. 9–13.

In step 808, the approximated position is reported to one or more host systems of one or more of the communication units located within the obstructed area. Initiation of position reporting by the infrastructure transceiver, rather than the communication unit as described in conjunction with FIG. 5, eliminates a need for the communication unit to report the approximated position back to the infrastructure transceiver. However, this alternate embodiment would require the infrastructure transceiver to have knowledge of the identities of the communication units located within the obstructed area and also knowledge of each communication unit's host system. After reporting the approximated position, the procedure ends.

FIGS. 9–13 describe methods of retransmitting signals to communication units using different types of signal distribution means. For signals which originate from a communication unit and are destined for a repeater base station (e.g., approximated positions which are to be reported to a host system), inverse processes are performed from those described in conjunction with FIGS. 9–13.

Figure 9:
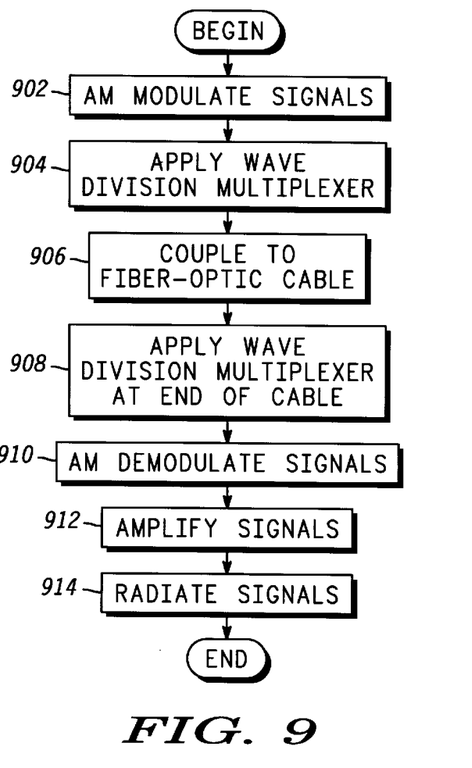
FIG. 9 illustrates a method for a repeater base station to retransmit signals using a fiber-optic distribution means in accordance with a preferred embodiment of the present invention.

FIG. 9 illustrates a method for a repeater base station to retransmit signals using a fiber-optic distribution means in accordance with a preferred embodiment of the present invention. The method begins after geolocation signals have been received, for example, in steps 204 (FIG. 2), 304 (FIG. 3) or 604 (FIG. 6). In step 902, the geolocation and communication RF signals are Amplitude Modulated (AM) onto two separate optical carriers, each with a unique wavelength. The optical modulation is typically in the form of direct AM modulation of a laser diode whose output amplitude is controlled by the amplitude of the input RF signal.

A wave division multiplexer (WDM) is then applied, in step 904, to combine the optical carriers into a single composite optical signal. Because the input optical carriers have different wavelengths, isolation between the optical carriers (and hence RF carriers) is provided by the WDM.

In step 906, the composite optical signal is coupled to a fiber optic cable signal distribution network. Fiber optic cabling is desirable because it provides very low loss transmission to the remote location.

Once the composite optical signal reaches the end of the fiber optic cable, it is wave division multiplexed back into two separate optical carriers in step 908. Isolation between the two optical carriers is provided by this second WDM.

The two optical carriers are then AM demodulated in step 910, resulting in the two separate geolocation and communication signals. The optical demodulation is typically in the form of direct AM demodulation by a photo detector diode whose output amplitude is controlled by the amplitude of the input optical signal.

In step 912, the geolocation and communication RF signals are then amplified and, in step 914, transmitted within the obstructed area by radiating the signal via a wide field of view RF antenna. The procedure then ends. The WDM is only used for exemplary purposes as a method to send multiple signals along a single fiber-optic cable. Clearly separate fiber cables could be used for each optical carrier in which case steps 904 and 908 would not be required.

Figure 10:
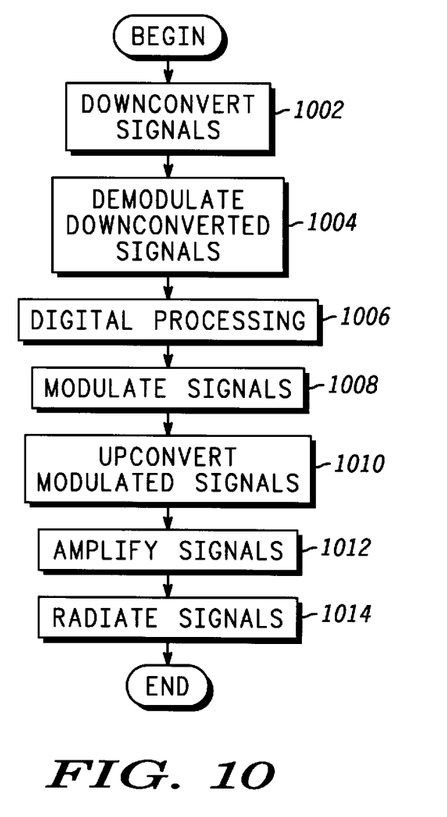
FIG. 10 illustrates a method for a repeater base station to retransmit signals using a fiber-optic distribution means in accordance with an alternate embodiment of the present invention.

FIG. 10 illustrates a method for a repeater base station to retransmit signals using a fiber-optic distribution means in accordance with an alternate embodiment of the present invention. The method begins, in step 1002, when received geolocation and communication signals are downconverted to IF frequencies which are low enough for RF demodulation to be performed. The IF signals are then demodulated, in step 1004, to translate the signals to baseband. The baseband signals are typically in digital format.

Digital processing is then performed, in step 1006, providing any necessary system functions such as data storage, time delay, header reformatting, and control signal insertion, for example.

The baseband signals are then modulated, in step 1008, onto suitable IF frequencies. In step 1010, the modulated IF signals are upconverted to suitable RF frequencies. The geolocation and communication RF signals are then amplified, in step 1012, and retransmitted, in step 1014, within the obstructed area by radiating via a wide field of view antenna. The procedure then ends.

Figure 11:
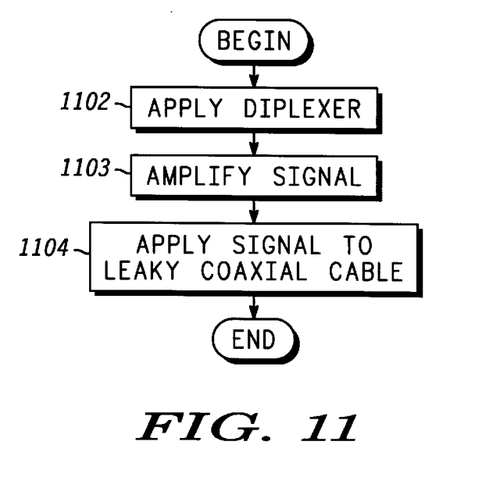
FIG. 11 illustrates a method for a repeater base station to retransmit signals using a leaky coaxial cable distribution means in accordance with a preferred embodiment of the present invention.

FIG. 11 illustrates a method for a repeater base station to retransmit signals using a leaky coaxial cable distribution means in accordance with a preferred embodiment of the present invention. The method begins after geolocation signals have been received, for example, in steps 204 (FIG. 2), 304 (FIG. 3) or 604 (FIG. 6). In step 1102, the geolocation and communication signals, when both are received, are combined, using a diplexer into a single composite signal. The signals will typically be at diverse frequencies. The frequency diversity between the two signals allows proper diplexing action to be accomplished and isolation between the signals to be maintained.

The composite signal is then amplified in step 1103 and applied, in step 1104, to a leaky coaxial cable distribution system. Because a leaky coaxial cable radiates controlled low levels of RF energy over its entire length, uniform coverage within the obstructed area can be achieved. If necessary, a diplexer/amplifier/diplexer combination can be employed at appropriate points along the distribution system to provide further signal boost. In addition, the amplification step 1103 could be applied prior to the diplexing step 1102. The procedure then ends.

Figure 12:
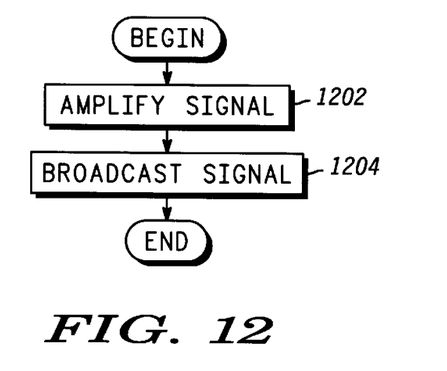
FIG. 12 illustrates a method for a repeater base station to retransmit signals by rebroadcasting in accordance with a preferred embodiment of the present invention.

FIG. 12 illustrates a method for a repeater base station to retransmit signals by rebroadcasting in accordance with a preferred embodiment of the present invention. The method begins after geolocation signals have been received, for example, in steps 204 (FIG. 2), 304 (FIG. 3) or 604 (FIG. 6). In step 1202, the received geolocation signal (or combined message and geolocation signal) is amplified. The amplified signal is then broadcast, in step 1204, using one or more broadcast antennas dispersed throughout the obstructed area. Isolation between the receiver and transmitter signals can be provided by physical separation between receive and transmit antennas or by time and/or frequency translation within the repeater. The procedure then ends.

Figure 13:
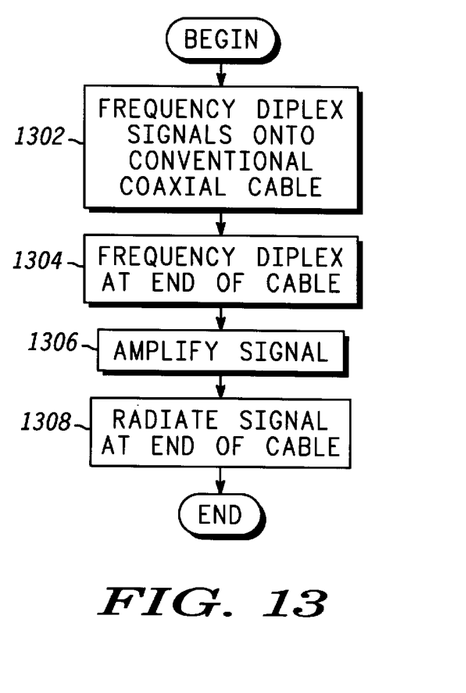
FIG. 13 illustrates a method for a repeater base station to retransmit signals using a conventional coaxial cable distribution means in accordance with a preferred embodiment of the present invention.

FIG. 13 illustrates a method for a repeater base station to retransmit signals using a conventional coaxial cable distribution means in addle with a preferred embodiment of the present invention. The method begins after geolocation signals have been received, for example, in steps 204 (FIG. 2), 304 (FIG. 3) or 604 (FIG. 6). In step 1302, the received geolocation signal (or combined message and geolocation signal) is frequency diplexed onto a single conventional coaxial cable distribution system. At the end of the cable, the composite signal is diplexed, if necessary, back into separate geolocation and communication RF signals using a suitable frequency diplexer, in step 1304. The signals are amplified in step 1306 and radiated in step 1308 using suitable RF antennas. The procedure then ends.

Figure 14:
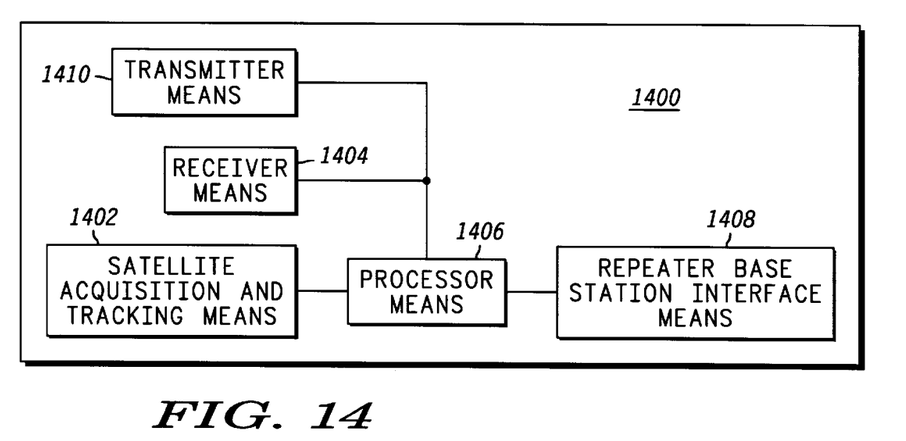
FIG. 14 illustrates a block diagram of an antenna in accordance with a preferred embodiment of the present invention.
Figure 15:
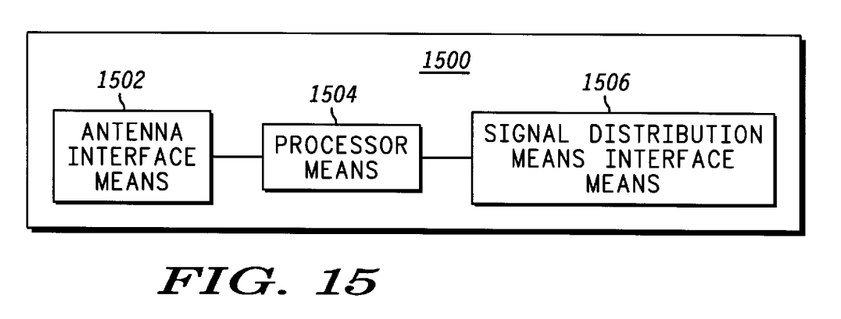
FIG. 15 illustrates a block diagram of a repeater base station in accordance with a preferred embodiment of the preset invention.
Figure 16:
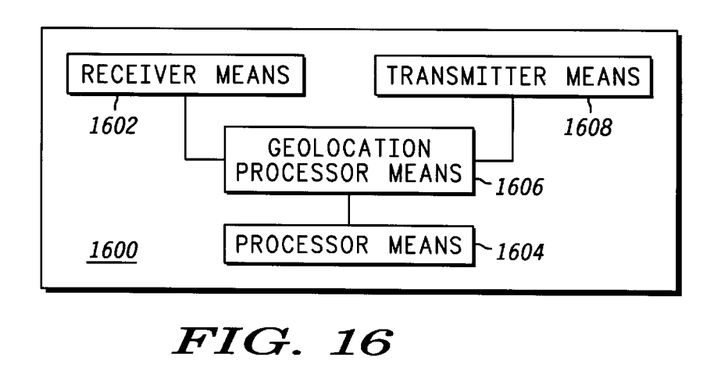
FIG. 16 illustrates a block diagram of a communication unit in accordance with a preferred embodiment of the present invention.

FIGS. 14–16 illustrate preferred embodiments of apparatuses used to carry out the method of the present invention. FIG. 14 illustrates a block diagram of antenna 1400 in accordance with a preferred embodiment of the present invention. Antenna 1400 comprises satellite acquisition and tracking means 1402, receiver means 1404, processor means 1406, repeater base station interface means 1408, and transmitter means 1410.

In a preferred embodiment, satellite acquisition and tracking means 1402 acquires and tracks at least one satellite such as, for example, navigation satellites (e.g., GPS satellites). In order to calculate a position in three dimensions, at least four satellites must be acquired although more or fewer satellites can be acquired. In alternate embodiments, satellite acquisition and tracking means 1402 can acquire and track other types of satellites (e.g., communication satellite 18, FIG. 1). Distinct physical equipment could be necessary to acquire and track each satellite. All such equipment is interpreted to be part of satellite acquisition and tracking means 1402, even though such equipment could be physically separated.

In an alternate embodiment, where geolocation is performed using equipment other than navigation satellites (e.g., ground-based equipment, airborne equipment, or satellites which move with respect to the surface of the earth), a different and appropriate acquisition and tracking means could be used in place of or in addition to satellite acquisition and tracing means 1402.

Receiver means 1404 is used to receive signals from at least one satellite or other device. These signals could contain, for example, information necessary to perform geolocation, or they could contain voice, data, facsimile, or paging information. Transmitter means 1410 is used to transmit signals (e.g., an approximate location of a communication unit or voice, data, or facsimile information) back to a host system.

Processor means 1406 is used, in a preferred embodiment, to control the functioning of the other components of antenna 1400. When signals to be retransmitted are not modified (e.g., FIG. 2), processor means 1406 does not need to, but may, alter such signals. Where signals to be retransmitted are modified (e.g., FIGS. 3, 6, 8), processor means 1406 can perform the modifications in a preferred embodiment. For example, when differential geolocation signals are retransmitted to communication units as described in conjunction with FIG. 3, processor means 1406 can perform some or all of steps 306–308. When geolocation signals are combined with a message from a communication satellite as described in conjunction with FIG. 6, processor means 1406 can perform some or all of steps 606–608. In addition, processor means 1406 can be used to perform voice and/or data processing when received signals are of a type other than geolocation information. In alternate embodiments, some or all of such modifications can be performed by a repeater base station (e.g., repeater base station 1500, FIG. 15).

Signals received by receiver means 1404 (and possibly modified by processor means 1406) are then sent to repeater base station interface means 1408 so that such signals can be retransmitted by a repeater base station (e.g., repeater base station 1500, FIG. 15). Repeater base station interface means 1408 can link antenna 1400 with a repeater base station over a hard-wired, or laser link, for example.

FIG. 15 illustrates a block diagram of repeater base station 1500 in accordance with a preferred embodiment of the present invention. Repeater base station 1500 comprises antenna interface means 1502, processor means 1504, and signal distribution means interface means 1506. One or more repeater base stations 1500 can be deployed within an obstructed area in order to provide signals to and receive signals from communication units within that area Antenna interface means 1502 links repeater base station 1500 to an antenna (e.g., antenna 1400, FIG. 14) and receives signals from and sends signals to the antenna over the link.

Processor means 1504 controls the other components of repeater base station 1500 and also controls retransmission of the signals received by antenna interface means 1502 or by communication units. When signals to be retransmitted are not modified (e.g., FIG. 2), processor means 1504 does not need to, but may, alter such signals. Where signals to be retransmitted are modified (e.g., FIGS. 3, 6, 8), processor means 1504 can perform the modifications although, in a preferred embodiment, such modifications are performed by the antenna. For example, when differential geolocation signals are retransmitted to communication units as described in conjunction with FIG. 3, processor means 1504 can perform some or all of steps 306–308. When geolocation signals are combined with a message from a communication satellite as described in conjunction with FIG. 6, processor means 1504 can perform some or all of steps 606–608.

Signal distribution means interface means 1506 connects repeater base station 1500 with an infrastructure distribution system such as, for example, a fiber-optic cable, leaky or conventional coaxial cable, or broadcast antenna system which is dispersed throughout all or a part of an obstructed area. Signals to be retransmitted, whether modified or not, are retransmitted via such infrastructure distribution system. In addition, signals received from communication units via the infrastructure distribution system are received though signal distribution means interface means 1506.

FIG. 16 illustrates a block diagram of communication unit 1600 in accordance with a preferred embodiment of the present invention. In a preferred embodiment, communication unit 1600 comprises receiver means 1602, processor means 1604, geolocation processor means 1606, and transmitter means 1608. In an alternate embodiment, communication unit 1600 need not include geolocation processor means 1606.

Receiver means 1602 receives signals from infrastructure distribution system when communication unit 1600 is located within an obstructed area. Processor means 1604 controls the components of communication unit 1600, where necessary, and processes received messages. Processor means can also perform voice and/or data processing functions when received signals are of a type other than geolocation information.

Geolocation processor means 1606 receives geolocation data, via receiver means 1602, and uses the geolocation data to self-determine a position of communication unit 1600. As described previously, geolocation data could be bent-pipe data which was received from the navigation satellites, or the geolocation data could be differential geolocation data which was modified by either antenna 1400 (FIG. 14) or repeater base station 1500 (FIG. 15). Transmitter means 1608 is used to transmit the approximated position or other responsive data, via an infrastructure transceiver, to a signal distribution means.

In an alternate embodiment, communication unit 1600 need not include geolocation processor means 1606 in order to determine an approximation of its position. When either antenna 1400 (FIG. 14) or repeater base station (FIG. 15) have approximated a position of the communication, communication unit 1600 need only extract the position approximation from the message in order to get an approximation of its position.

In summary, a method and apparatus has been described which enables signals to be retransmitted within an obstructed area. The receipt of such signals allows a communication unit within the obstructed area to generate responsive data. The responsive data can then be sent by the communication unit to a host system via the infrastructure transceiver. Responsive data can be, for example, the communication unit position or other data such as voice, data, or facsimile data. Knowledge of the communication unit position is important for contacting a particular communication unit and also for billing purposes.

The present invention has been described above with reference to preferred and alternate embodiments. However, those skilled in the art will recognize that changes and modifications may be made in these embodiments without departing from the scope of the present invention. For example, the processes and stages identified herein may be categorized and organized differently than described herein while achieving equivalent results. These and other changes and modifications which are obvious to those skilled in the art are intended to be included within the scope of the present invention.

What is claimed is:

1. A method for providing a duplex geolocation service to a communication unit located within an area where an obstruction exists between the communication unit and a navigation satellite, the method comprising the steps of:
   a) receiving geolocation information from an antenna located in a proximity to the area, wherein the antenna receives a geolocation signal from the navigation satellite;
   b) retransmitting the geolocation information by applying the geolocation information to a signal distribution means which is dispersed throughout the area so that the communication unit can receive the geolocation information;
   c) receiving, from the communication unit via the signal distribution means, an approximated position which the communication unit approximated using the geolocation information; and
   d) reporting the approximated position to a host communication system which is associated with the communication unit.

2. The method as claimed in claim 1, wherein step b) comprises the step of:
   b1) extracting satellite almanac data from the geolocation information;
   b2) extracting timing information from the geolocation information;
   b3) reconfiguring the geolocation information into a differential geolocation signal using delays derived from the timing information and the satellite almanac data, resulting in a reconfigured signal; and
   b4) retransmitting the reconfigured signal as the geolocation information.

3. A method for providing a duplex geolocation service to a communication unit located within an area where an obstruction exists between the communication unit and a navigation satellite, the method comprising the steps of:
   a) receiving geolocation information from an antenna located in a proximity to the area, wherein the antenna receives a geolocation signal from the navigation satellite;
   b) calculating a position from the geolocation information;
   c) retransmitting the position to the communication unit by applying the position to a signal distribution means which is dispersed throughout the area so that the communication unit can receive the position; and
   d) reporting the position to a host communication system which is associated with the communication unit.

4. A method for providing a duplex data service to a communication unit located within an area where an obstruction exists between the communication unit and a wireless signal transmitter, the method comprising the steps of:
   a) receiving a wireless signal from the signal transmitter by a device located in a proximity to the area; and
   b) retransmitting the signal, by the device, by applying the signal to a signal distribution means which is dispersed throughout the area so that the communication unit can receive the signal;
   c) receiving, from the communication unit via the signal distribution means, responsive data; and
   d) sending the responsive data by the device, through a wireless link to a host communication system which is associated with the communication unit.

5. The method as claimed in claim 4, wherein the signal is a data packet destined for the communication unit.

6. The method as claimed in claim 4, wherein the area exists within a building, and step a) comprises the step of:
   a1) receiving the signal by the device, wherein the device is located in a proximity to the building,
and wherein step b) rises the step of:
   b1) transmitting the signal by applying the signal to the signal distribution means which is dispersed throughout the building.

7. The method as claimed in claim 4, wherein step a) comprises the step of:
   a1) receiving the signal from a satellite.

8. A method for a communication unit to send and receive signals when the communication unit is located within an area where an obstruction exists between a wireless signal transmitter and the communication unit, the method comprising the steps of:
   a) receiving a first wireless signal from a signal distribution means which is dispersed throughout the area, wherein the signal distribution means received the first wireless signal from the wireless signal transmitter and retransmitted the first wireless signal throughout the area;
   b) calculating responsive data in response to the first wireless signal; and
   c) sending the responsive data through a wireless link to a host system associated with the communication unit by transmitting the responsive data to the wireless signal transmitter using the signal distribution means.

9. A method for a communication unit to send and receive signals when the communication unit is located within an area where an obstruction exists between a signal transmitter and the communication unit, the method comprising the steps of:
   a) receiving a geolocation signal from a signal distribution means which is dispersed throughout the area, wherein the signal distribution means received the geolocation signal from the signal transmitter and retransmitted the geolocation signal within the area;
   b) calculating responsive data which represents an approximate position of the communication unit, wherein the approximate position is calculated from geolocation information contained within the geolocation signal, wherein the geolocation signal is substantially similar to a first signal received by an antenna located in a proximity to the area and coupled to the signal distribution means; and
   c) sending the responsive data to a host system associated with the communication unit by transmitting the responsive data using the signal distribution means.

10. The method as claimed in claim 9, wherein the geolocation information comprises differential geolocation information.

11. A method for a communication unit to send and receive signals when the communication unit is located within an area where an obstruction exists between a signal transmitter and the communication unit, the method comprising the steps of:
   a) receiving a geolocation signal from a signal distribution means which is dispersed throughout the area, wherein the signal distribution means received the geolocation signal from the signal transmitter and retransmitted the geolocation signal within the area;
   b) calculating responsive data which represents an approximate position of the communication unit from information contained within the geolocation signal, wherein the geolocation signal comprises a location of an antenna which is located in a proximity to the area and which is coupled to the signal distribution means, the antenna is fixed in space, and the location of the antenna is a programmed location; and
   c) sending the responsive data to a host system associated with the communication unit by transmitting the responsive data using the signal distribution means.

12. A communication system comprising:
   multiple navigation satellites for sending geolocation signals;
   a repeater base station located in a proximity to an obstructed area within which the geolocation signals are significantly attenuated, wherein the repeater base station is coupled to an antenna which receives the geolocation signals from the multiple navigation satellites and to a signal distribution means dispersed throughout the obstructed area, the repeater base station retransmits the geolocation signals within the obstructed area using the signal distribution means, and the repeater base station reports an approximate position of a communication unit located within the obstructed area to a host system, wherein the approximate position is calculated from the geolocation signals; and
   the communication unit located within the obstructed area, for receiving the geolocation signals which are retransmitted by the repeater base station.

13. The communication system as claimed in claim 12, wherein the communication unit is further for calculating the approximate position of the communication unit using the geolocation signals which are retransmitted by the repeater base station, and for reporting the approximate position to the host system via the repeater base station.

14. The communication system as claimed in claim 12, wherein the repeater base station is further for calculating the approximate position of the communication unit using the geolocation signals, and for transmitting the approximate position to the communication unit using the signal distribution means.

15. A repeater base station for receiving and retransmitting geolocation signals, the repeater base station comprising:
   a receiver for receiving the geolocation signals from at least one navigation satellite via an antenna coupled to the repeater base station;
   a processor, coupled to the receiver, for generating geolocation information by processing the geolocation signals in order to prepare them for retransmission within an obstructed area within which the geolocation signals from the at least one navigation satellite would be significantly attenuated;
   an infrastructure distribution system interface, coupled to the processor and to an infrastructure distribution system which is dispersed throughout the obstructed area, the infrastructure distribution system interface for retransmitting the geolocation information to a communication unit located within the obstructed area using the infrastructure distribution system; and
   a transmitter, coupled to the processor, for reporting an approximate position of the communication unit to a host system associated with the communication unit.

16. The repeater base station as claimed in claim 15, wherein the processor is further for calculating the approximate position using the geolocation signals and wherein the infrastructure distribution system interface is for retransmitting the geolocation information comprising the approximate position to the communication unit via the infrastructure distribution system.

17. The repeater base station as claimed in claim 15, wherein the infrastructure distribution system interface is further for receiving the approximate position from the communication unit after the communication unit calculated the approximate position from the geolocation information and after the communication unit reported the approximate position to the repeater base station via the infrastructure distribution system.

18. A repeater base station for receiving and retransmitting signals, the repeater base station comprising:
   a receiver for receiving the signals from at least one satellite via an antenna coupled to the repeater base station;
   a processor, coupled to the receiver, for generating information by processing the signals in order to prepare them for retransmission within an obstructed area within which the signals from the at least one satellite would be significantly attenuated;
   an infrastructure distribution system interface, coupled to the processor and to an infrastructure distribution system which is dispersed throughout the obstructed area, the infrastructure distribution system interface for retransmitting the information to a communication unit located within the obstructed area using the infrastructure distribution system; and
   a transmitter, coupled to the processor, for reporting responsive data from the communication unit through a wireless link to a host system associated with the communication unit, wherein the communication unit created the responsive data from the information, and wherein the host system communicates with the repeater base station through the at least one satellite.

19. A communication unit for use within an obstructed area where geolocation signals from at least one navigation satellite are attenuated due to an obstruction between the communication unit and the at least one navigation satellite, the communication unit comprising:
   receiver means for receiving the geolocation signals from an infrastructure transceiver means which is dispersed throughout the obstructed area when the communication unit does not receive the geolocation signals directly from the at least one navigation satellite;
   processor means, coupled to the receiver means, for calculating an approximate position of the communication unit based on the geolocation signals; and transmitter means, coupled to the processor means, for transmitting the approximate position to a host system associated with the communication unit via the infrastructure transceiver means.

20. The communication unit as claimed in claim 19, wherein the processor is further for calculating the approximate position of the communication unit based on the geolocation signals, wherein the geolocation signals comprise differential geolocation information.

21. A communication unit for use within an obstructed area where wireless signals from at least one satellite are attenuated due to an obstruction between the communication unit and the at least one satellite, the communication unit comprising:

receiver means for receiving wireless signals from an infrastructure transceiver means which is dispersed throughout the obstructed area when the communication unit does not receive the wireless signals directly from the at least one satellite;

processor means, coupled to the receiver means, for creating responsive data; and transmitter means, coupled to the processor means, for transmitting the responsive data through a wireless link, via the infrastructure transceiver means, to at least one satellite of a host system associated with the communication unit.

* * * * *

UNITED STATES PATENT AND TRADEMARK OFFICE
CERTIFICATE OF CORRECTION

PATENT NO. : 5,812,086
DATED : September 22, 1998
INVENTOR(S) : Bary Robert Bertiger et al.

It is certified that error appears in the above-indentified patent and that said Letters Patent is hereby corrected as shown below:

Claim 4, column 14, line 12, insert --,-- after "data".

Claim 6, column 14, line 22, replace "transmitting" with "retransmitting".

Signed and Sealed this

Twentieth Day of July, 1999

Attest:

Q. TODD DICKINSON

*Attesting Officer*    *Acting Commissioner of Patents and Trademarks*